United States Patent Office 3,164,641
Patented Jan. 5, 1965

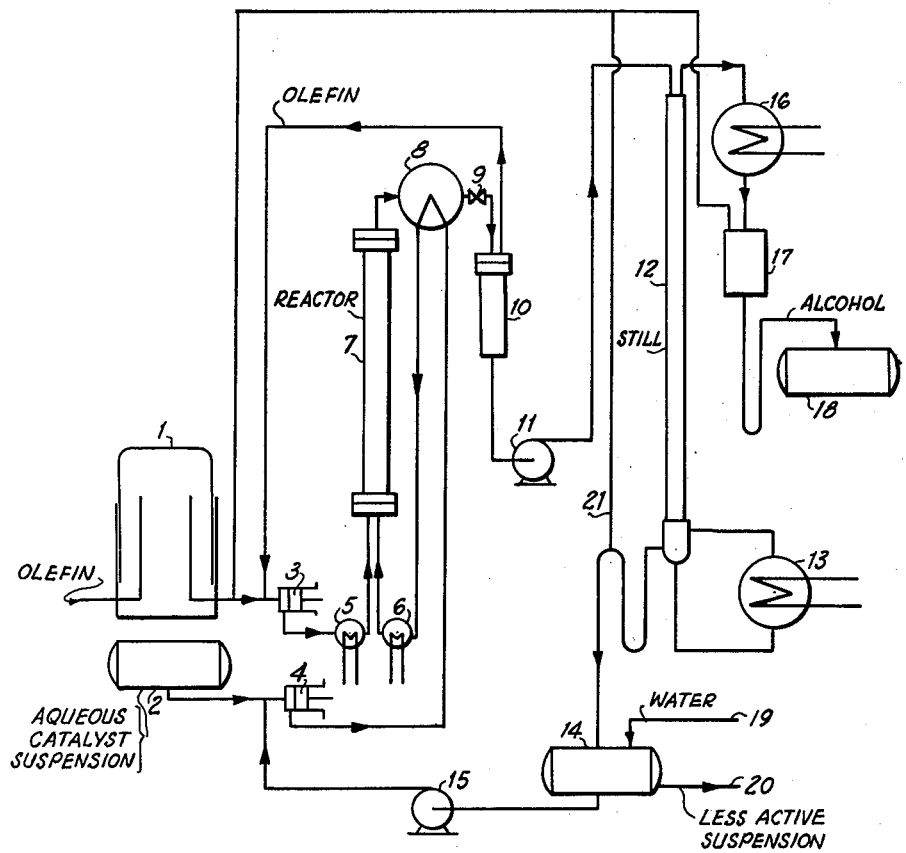

3,164,641
CATALYTIC PROCESS FOR THE DIRECT HYDRATION OF GASEOUS OLEFINS TO ALCOHOLS
Pietro Bazzarin, Milan, Italy, assignor to Montecatini, Societa Generale per l'Industria Mineraria e Chimica, Milan, Italy
Filed Aug. 10, 1959, Ser. No. 832,851
Claim priority, application Italy Sept. 9, 1958
6 Claims. (Cl. 260—641)

This invention relates to a process for direct hydration, in heterogeneous phase, of olefins containing 2 to 4 carbon atoms to alcohols with the aid of catalysts. The process can be operated in batch or continuous operation.

It is known that olefins can be reacted with water to yield the corresponding alcohols:

$$C_nH_{2n} + H_2O \rightarrow C_nH_{2n+1}OH$$

The reaction is reversible and does not take place to any practical extent under ordinary temperature and pressure and in the absence of a suitable catalyst.

Many expedients and procedures have been investigated in the past in order to facilitate or favor the reaction to obtain rapid conversion of olefins to alcohols with the lowest possible formation of side-products.

One of the processes most widely used is based on the use of concentrated acids, such as sulfuric acid employed either alone or in the presence of suitable activators. In this type of process, however, the purpose is to operate in two successive working stages. The first stage is an esterification stage, in which mainly alkyl-sulphuric acid or alkyl sulphate are obtained, depending upon the operating conditions used. The second stage involves the hydrolyzation of the product formed in the first stage in order to obtain the corresponding alcohol.

For economical operation, the acid diluted in the second stage of the process must then be concentrated again. The use of concentrated warm acids, generally under high pressures, involves the continuously present technological problems of maintenance and hazardous operation.

It has also been proposed to carry out both reactions in a single stage with strong acids of average concentration, but the cost of such process appears prohibitive because of the conditions to which the material of the reactor would be subjected under high temperature and pressure.

During the last few years a number of processes have been developed based on the use of a catalyst capable of effectuating satisfactorily the reaction by direct synthesis from olefin and water, without using acids.

Various catalysts have been proposed for this purpose. The reaction can be carried out at high temperatures and pressures by passing a suitably proportioned mixture of an olefin with steam in contact with a granular catalyst or by subjecting said catalyst to a rain of water while a stream of gaseous olefin is passed through the catalyst. The use of catalysts dispersed in water has also recently been proposed.

Among the catalysts most widely used at present in the direct hydration of olefins, on a commercial scale, are phosphoric acid supported on celite, used mainly in the hydration of ethylene with water vapor, and tungstic acid and other tungsten oxides prevailingly employed in the hydration of propylene with a granular catalyst sprinkled with a water rain.

It is known that active alumina is a very good catalyst for the dehydration of alcohols to the corresponding olefins and from that behaviour it may be deduced that, under suitable temperature and pressure conditions, the same catalyst can also favor the reverse reaction. As a matter of fact this is not true, although many attempts have been made to employ alumina as olefin-hydration catalyst.

There are in fact some patents which claim the use of alumina as hydration catalyst. The yield and conversions disclosed in said patents are insufficient to permit advantageous and economic use of said catalyst.

In contrast, we have now found, surprisingly, that alumina in the form of gel or sol can be profitably used as a dispersed catalyst if it is employed within a suitably selected pH range. One of the preferred procedures for its use is in the form of an aqueous dispersion of its gel, the suitable pH being obtained by addition of a mineral acid, such as sulphuric or hydrochloric acid, to operate at a pH between 2 and 6, preferably between 2.5 and 5.0.

The catalytic activity of the aqueous suspension thus obtained has a direct relationship to the adjusted pH of the suspension. Stated more precisely the activity is in inverse ratio to the pH. However, below a given limit the use of the suspension would require careful selection of the materials capable of withstanding the corrosive action, whereas at pH values near neutrality or higher, the alcohol production becomes negligible and side-reactions, mainly polymerization reactions, are promoted. The catalytic hydration of olefins with the aid of the catalyst of the present invention can be carried out either continuously or batchwise. The former process is generally more advantageous. During the continuous run, the pH of the catalytic suspension decreases, while, at the same time, the alumina gel undergoes a decrease in the degree of hydration. Said diminutions are marked during the first recycle, and then decrease more and more slowly in the subsequent cycles until they reach almost constant values which are dependent on the pH value at which the suspension was initially adjusted.

However, to obtain better conditions of use, it is better to limit both the pH decrease and the decrease in the degree of hydration of the alumina to values which can assure good suspensibility, lower formation of side products, and finally, the absence of corrosion.

This condition is realized by substituting a fresh suspension for a portion of the circulating suspension, for each passage.

The removal of a portion of the circulating suspension can be accompanied by use of a suitable system for selection of the suspensed particles, such as levigation, or centrifugation, introduced at a suitable zone of the plant, to remove the heavier particles preferably.

The proportional amount to be removed depends on both the time the solution has been in the reactor and on the minimum linear flow-rate of the suspension through the plant.

The fresh gel, dried at 110° C., has a molar ratio of $H_2O$ to $Al_2O_3$ equal to 3, and therefore the hydration water represents about 34–35% of the gel. In order to obtain an easily circulating gel, the proportion of water should preferably not be lower than 15%, and should preferably be kept between 15 and 20%. However, lower values and finely dispersed $Al_2O_3$ can be employed, provided that suitable means is used to maintain the suspension.

The pH values of the circulating solution in a continuous apparatus are kept at between 2 and 6, preferably at between 2 and 3.5, and are adjusted by adding fresh suspension prepared from an alumina gel dispersed and acidified with a mineral acid at a pH of between 2 and 6, preferably between 2.5 and 6. Suitable correction can be made by addition of mineral acids, preferably sulfuric acid.

The accompanying drawing presents a flow diagram of a continuous process carried out according to the invention.

The raw materials employed in this process are the olefin and the water which contains the dispersed catalyst. The olefin coming from gas holder 1 is introduced into the bottom of 7 after compression in pump 3 and preheating in 5. The aqueous catalytic suspension, coming in part from the recycling and in smaller part from the fresh-suspension tank 2, is also introduced into the bottom of reactor 7 by means of pump 4, after having been preheated in heat exchanger 8 and heater 6.

The catalytic suspension enriched with the reaction products leaves the reactor 7, together with the unreacted olefin, through decompression valve 9 and reaches separator 10 from which the olefin is recycled by expansion to the gas holder or its outlet. From the separator the reacted suspension is introduced by dosing pump 11 into the exhausting and distillation column 12. The suspension in said exhausting column is heated by passage through heater 13, by the conventional system. The exhausted suspension is preferably kept under a gasometric head of the olefin being treated, by means of conduit 21.

The exhausted suspension continuously leaves the vessel or column 12 at the bottom and passes into tank 14. After a suitable water addition at 19 to replace a portion of the less active suspension drained off at 20, and after oil extraction, and control or adjustment of pH, the suspension is recycled to the reactor by pump 4, after passing through heat exchanger 8 and heater 6. All of these operations must be carried out in an inert atmosphere, preferably under a gasometric head of the olefin being treated.

The crude alcohol, having a concentration of 50–60%, is withdrawn from the top of the exhausting and distillation tower 12, and is then condensed in 16, collected in 17 and sent to the stock tank 18, before sending it to rectification columns according to known techniques.

The reaction conditions vary, depending on the olefin employed, but remain within the temperature range of between 180° and 300° C. and within the pressure range of between 100 and 350 atm.

A number of precautions of basic importance must be kept in mind for the best technological realization of the process.

The rector material is particularly important because the catalyst, due to its acidic character, can be contaminated by traces of foreign metals, which lower its activity. We have found that the catalyst activity is reduced after only one working cycle if the reactor is made of steel 18/8 iron, steel No. 8, Hastelloy. The catalyst activity, on the contrary, is not lowered if other metals, particularly aluminium or copper, are employed.

In order to preserve the catalyst activity it is also necessary to avoid any contact of the catalytic suspension coming from the reactor with air or any other oxidant atmosphere. Therefore the distillation and the recycling step are carried out under an inert or reducing gas atmosphere. Among the gases that can be employed to avoid contact of the suspension with the air I include the olefin which is being hydrated to the alcohol.

Examples 2, 3 and 4 set forth below show the influence exerted on the catalysts by the material with which the inner surfaces of the reactor is lined. Examples 8 and 9 relate more specifically to the lowering of catalytic activity during successive working cycles if the suspension is not preserved from contact with air between one working cycle and the subsequent one. Examples 10, 14 and others relate to working cycles carried out in the absence of air.

The catalytic suspension is preferably prepared by reacting aluminum nitrate with $NH_3$ while stirring, and operating in glass or enamelled vessels. The aluminum nitrate is obtained by dissolving $Al_2O_3$ in concentrated nitric acid. The precipitation is carried out under suitable dilution conditions so as to obtain precipitated $Al(OH)_3$ having a concentration of about 30 g./l. This suspension is thoroughly washed with water until no ammonia or nitric ions are present and is then diluted to the desired concentration of $Al(OH)_3$. The suspension is finally acidified to the desired pH and is ready for the use. Owing to the hydrophilic property of the alumina gel thus prepared, the gel requires a long time for decantation and therefore the resulting aqueous suspensions are suitable for circulation in a plant. A gel suspension of 10 g./liter (calculated as $Al(OH)_3$) prepared as described above, requires more than 48 hours before showing a clear upper layer corresponding to 70% of the total valume of the suspension.

One liter of a suspension having the aforementioned concentraiton can yield more than 100 g. $C_2H_5OH$ per hour per autoclave liter, under suitable working conditions, or more than 200 g. isopropanol per hour per autoclave liter, which is to be compared with the 150 g./hour/liter obtainable with the commercial catalyst based on tungsten.

The present process has nothing in common with the processes based on use of diluted sulphuric acid solutions, since the concentration of free acid remains in any case lower than 1 part per 1,000. Under such conditions no process involving use of aqueous acid solutions alone can claim an appreciable alcohol production.

The following examples are given only to illustrate the present invention, and are not intended to limit its scope.

*Example 1*

16 grams of granular alumina, finely ground and dispersed in 400 cc. water, are introduced into a 940-cc. rotating autoclave. The alumina shows a pH of 7.5. After reaction with ethylene at 350° C. under a pressure of 250 atm. for 4 hours, the solution contains 10 cc. oily polymer and only traces of alcohol.

The same suspension, acidified with $H_2SO_4$ to a pH of 6.5 and treated under the same run conditions, yields 17 g. ethanol, free of polymerization oils.

*Example 2*

400 cc. of an aqueous alumina gel suspension containing 1% alumina gel (calculated as $Al(OH)_3$), acidified with $H_2SO_4$ to a pH of 4.15, are introduced into a rotating steel Inox 18/8 autoclave of about 0.94 liter capacity.

The autoclave is washed with ethylene and the suspension is then reacted with 98 g. ethylene at 290° under the initial pressure of 340 atm. for 4 hours.

After cooling the autoclave is opened and the suspension is distilled showing an ethanol content of 22.4 g. together with 2.4 g. ether and 0.5 g. oil.

About 6 g. ethanol per 100 g. suspension charged into the reactor are therefore obtained.

The conversion is therefore 16% and the yield 84%.

*Example 3*

200 cc. of a 1% aqueous aluminum gel suspension, acidified with $H_2SO_4$ to a pH of 4.2 are introduced into a rotating autoclave having an inner aluminum lining and having a capacity of about 0.3 liter.

After washing with ethylene, the suspension is reacted for 4 hours at 290° C. under the initial pressure of 340 atm. 78 g. ethylene are used.

After cooling the autoclave is opened and the suspension is found to contain:

|  | G. |
|---|---|
| Ethanol | 22.43 |
| Acetaldehyde | 0.22 |
| Oils | 0.4 |
| Ether | 1.00 |

11.6 g. ethanol per 100 cc. of the suspension charged in the reactor are thus obtained. An ethylene conversion of about 19% with a yield of about 91% is obtained.

*Example 4*

200 cc. of a 1% aqueous alumina gel soltuion, acidified with $H_2SO_4$ up to a pH of 4.15 are charged into a rotating autoclave lined inside with copper and having a capacity of about 0.65 liter.

After washing with ethylene the suspension is reacted for 4 hours at 290° C. with 80 g. ethylene under an initial pressure of 340 atm.

The autoclave is opened and the suspension is found to contain:

| | G. |
|---|---|
| Ethanol | 22.85 |
| Oils | 0.33 |
| Acetaldehyde | 0.11 |
| Acetone | 0.09 |
| Ether | 0.77 |

The ethylene conversion appears to amount to about 19% with an ethanol yield of 92.5%.

Example 5

By carrying out the reaction as indicated above but with 250 cc. of a 2% aqueous alumina gel suspension acidified with $H_2SO_4$ to a pH of 4.2, the reacted suspension is found to contain 32.1 g. ethanol.

Example 6

By carrying out the reaction as in Example 5 but with a 3% $Al(OH)_3$ suspension at a pH of 4, the reacted suspension is found to contain 32.1 g. ethanol.

Example 7

By carrying out the reaction as in Example 4 but with a suspension acidified to a pH of 3, the reacted suspension is found to contain 33.77 g. ethanol.

Example 8

The same suspension as in Example 2, which by distillation yields 22.4 g. ethanol, is brought again to the initial volume of 400 cc. by addition of distilled water and is introduced again into the same Inox-steel autoclave for a second working cycle. The total ethanol production in the second cycle is 14.54 g. The operation is repeated in a third cycle after which the formation of 10.65 g. ethanol is ascertained.

A similar series of cycles repeated under the same conditions causes the formation of 24.8 g., 13.4, 9.23 g. and 7.87 g. in the first, second, third and fourth working cycle, respectively.

In these operations the suspension, still hot after distillation, is left in contact with air which however is then eliminated in the reactor by repeated washing out with ethylene. The catalytic suspension by analysis after the third recycling appears already contaminated by the presence of foreign metals, such as iron and nickel, e.g., 4% Fe and 0.49% Ni per 100 g. $Al_2O_3$ used.

Example 9

Into the same rotating autoclave provided with a copper lining as in Example 1, 250 cc. 1% aqueous alumina gel suspension at a pH of 4.25 are introduced.

After reaction with ethylene for 4 hours at 290° C. the suspension is removed from the autoclave, distilled at room pressure, adjusted again to the initial volume and introduced again into the autoclave for a subsequent working cycle.

In 6 successive cycles 27.65, 20.9, 14, 12.4, 8.4 and 5.56 g. ethanol respectively are obtained.

Example 10

200 cc. of the same catalytic suspension are introduced into the same autoclave as in the preceding example. The suspension is then reacted with ethylene for 4 hours at 290° C. under an initial pressure of 340 atm. After cooling to about 230° C., a portion of the liquid is slowly distilled from the autoclave until the alcohol formed is completely withdrawn.

20.70 grams of ethyl alcohol are present in the collected liquids.

Into the autoclave kept under a pressure higher than atmospheric, the calculated amount of water removed by distillation is introduced, the working conditions are readjusted and a further working cycle of the catalyst is carried out.

After 44 working cycles the catalytic suspension still yields 18.4 g. ethyl alcohol.

Example 11

200 cc. of a 1% aqueous alumina gel suspension acidified with hydrochloric acid to a pH of 3.85 are charged into the same rotating autoclave as in example 4. The autoclave is evacuated and 130 g. propylene are charged. The suspension is reacted for 4 hours at 210° C. under an initial pressure of 200 atm.

At the end of the run the alcohol suspension thus obtained is distilled. 4.2 grams of the ternary azeotrope water-alcohol isopropyl ether, 30.9 grams of water-alcohol azeotrope and 0.3 g. oily polymer are recovered. The conversion thus corresponds to 20.6% and the yield to 91%.

Example 12

200 cc. of a 1% aqueous alumina gel suspension (calculated as $Al(OH)_3$) acidified with $H_2SO_4$ to a pH of 4.1 are charged into the same rotating autoclave as in preceding example. The autoclave is evacuated, 135 g. propylene are charged and the suspension is reacted for 4 hours at 210° C. under an initial pressure of 200 atm.

At the end of the run the alcoholic suspension thus obtained is distilled, recovery:

3.15 g. ternary azeotrope, water-alcohol-isopropyl ether
41.52 g. water-isopropyl alcohol azeotrope
0.3 g. oily polymers When a catalytic suspension at different pH values is used, under the above-mentioned reaction conditions, the following average amounts of isopropanol per 1000 cc. suspension are obtained:

| pH | 4.1 | 4.5 | 5 | 5.5 | 6 | 6.9 |
|---|---|---|---|---|---|---|
| Isopropanol, g | 20 | 16 | 13 | 9.5 | 6 | 0.9 |

Example 13

By carrying out a propylene hydration run at 210° C. under an initial pressure of 250 atm. for 4 hours in the same apparatus and with the same catalytic suspension as described in the preceding example, average amounts of 50.82 g. water-alcohol azeotrope together with 5.32 g. of a lighter fraction containing the ternary azeotrope and 1 gram of oily polymer are obtained.

A run, carried out at 250° C. and 250 initial atm., with 200 cc. of 1% catalytic suspension at a pH of 4.1 and within 3-minute and 30-minute shorter reaction periods, resulted in 36.6 and 40.9 g. of water-alcohol azeotrope together with 2.12 g. and 2.4 g. respectively of a lighter fraction containing the ternary azeotrope. Only imponderable traces of oily polymers were present.

Example 14

Propylene and an aqueous catalytic suspension of alumina gel acidified with $H_2SO_4$ to a pH of 4.65 are introduced from the bottom into a tubular reactor provided with an inner copper lining.

The catalytic suspension leaving the reactor and containing alcohol, is sent under a propylene head to a stripping and distilling tower.

After distillation the catalytic suspension is brought again to the initial volume and its pH adjusted, a portion corresponding to 10% of the catalyst being replaced and the suspension being recycled to the reactor. Said catalytic suspension recycled to the reactor has a pH of 2.5. If it does not, it is readjusted to this value.

By employing a 1% alumina gel suspension acidified with $H_2SO_4$ to a pH of 4.65 and introducing it into the reactor at the rate of 1 liter suspension per hour per liter of reactor, a production per hour of 2.32 g. isopropyl ether, 209.8 g. isopropyl alcohol, and 5.28 g. oily polymers is obtained. A propylene conversion of about 17% with a yield of 95.3% is thus present.

*Example 15*

Propylene and an aqueous suspension of acidified alumina gel are introduced continuously through the bottom into a tubular reactor provided with an inner copper lining.

The catalytic suspension leaving the reactor and containing alcohol is sent under a propylene head to a stripping and distillation column. The reaction products are thus separated and the suspension is brought again to its initial volume, its pH as well as the hydration degree of the suspended gel are controlled and a portion is replaced with a fresh suspension.

The proportional amount removed after each cycle corresponds to about 3.5% of the feed; it contains alumina gel with 16.5% $H_2O$ and presents a pH of 2.1.

The fresh catalytic suspension is prepared by acidifying, up to pH of 4.1, an aqueous alumina gel suspension containing 10 g./l. $Al(OH)_3$.

The adjusted suspension entering the reactor contains $Al_2O_3$ gel with 18.5% $H_2O$ and has a pH of 2.2. It is introduced into the reactor at the rate of 5.5 liter/hour/liter of catalytic chamber.

With a propylene conversion of 21.7%, 515 g. isopropanol, 8 g. isopropyl ether and 0.72 g. oily polymers are obtained.

The continuous processes of Examples 15 and 16 are similarly carried out with ethylene, butene-1, and butene-2.

*Example 16*

200 cc. of a 1% alumina gel suspension, acidified with $H_2SO_4$ to a pH of 4.25, are introduced into the same rotating autoclave as in Example 4. 160 g. of a mixture consisting of 60% butene-1 and 40% butene-2 are introduced. After reaction at 200° C. under a pressure of 250 atm. for 4 hours the suspension is found to contain 10.9 grams of secondary butanol and 2.2 g. n-butanol. Small amounts of butyl esters are also present.

I claim:

1. A continuous process for direct hydration of propylene to an alcohol, which comprises reacting propylene with liquid water at a temperature of about 180° to 300° C. under a pressure of between about 100 and 300 atmospheres in the presence of an aqueous suspension of $Al(OH)_3$ gel having a pH of between 2 and 6 as adjusted by addition of sulfuric acid.

2. A continuous process for direct hydration of ethylene to alcohol, which comprises reacting ethylene with liquid water at a temperature of about 180° to 300° C. under a pressure of between about 100 and 300 atmospheres in the presence of an aqueous catalytic suspension of $Al(OH)_3$ gel having a pH of between 2 and 6 as adjusted by addition of sulfuric acid.

3. A continuous process for direct hydration of a butene to an alcohol, which comprises reacting a butene hydrocarbon with liquid water at a temperature of about 180° to 300° C. under a pressure of between about 100 and 300 atmospheres in the presence of an aqueous catalytic suspension of $Al(OH)_3$ gel having a pH of between 2 and 6 as adjusted by addition of sulfuric acid.

4. A process for direct hydration of a gaseous olefin to an alcohol, which comprises reacting an olefin hydrocarbon having 2 to 4 carbon atoms with liquid water at a temperature of about 180° to 300° C. under a pressure of between about 100 to 340 atmospheres in the presence of an aqueous suspension of a catalyst selected from the group consisting of $Al(OH)_3$ in the form of gel, and finely divided $Al_2O_3$, said catalyst suspension having a pH of between 2 and 6 as adjusted by addition of a mineral acid.

5. A process for direct hydration of a gaseous olefin to an alcohol, which comprises reacting an olefin hydrocarbon having 2 to 4 carbon atoms with liquid water at a temperature of about 180° to 300° C. under a pressure of between about 100 to 340 atmospheres in the presence of an aqueous suspension of a catalyst selected from the group consisting of $Al(OH)_3$ in the form of gel, and finely divided $Al_2O_3$, said catalyst suspension having a pH of between 2 and 6 as adjusted by addition of sulfuric acid.

6. A process for direct hydration of a gaseous olefin to an alcohol, which comprises reacting an olefin hydrocarbon having 2 to 4 carbon atoms with liquid water at a temperature of about 180° to 300° C. under a pressure of between about 100 to 340 atmospheres in the presence of an aqueous catalytic suspension of $Al(OH)_3$ gel, said catalyst suspension having a pH of between 2 and 6 as adjusted by addition of a mineral acid.

References Cited in the file of this patent

UNITED STATES PATENTS

| | | |
|---|---|---|
| 2,139,953 | Guinot | Dec. 13, 1938 |
| 2,144,750 | Bent | Jan. 24, 1939 |
| 2,292,561 | Eversole et al. | Aug. 11, 1942 |
| 2,673,221 | Schraeder et al. | Mar. 23, 1954 |

OTHER REFERENCES

Remy: Treatise on Inorganic Chemistry, 1, 363 (1956).